(12) United States Patent
Michelitsch et al.

(10) Patent No.: US 7,716,220 B2
(45) Date of Patent: May 11, 2010

(54) CONTENT RECOMMENDATION DEVICE WITH AN ARRANGEMENT ENGINE

(75) Inventors: Stefan Michelitsch, Graz (AT); Otto Zich, Salzburg (AT); Andreas Spechtler, Grödig (AT); Balthasar Schramm, Potsdam (DE); Andreas Riegler, Tenneck (AT); Oliver Petro, Hallein (AT); Thomas Nemetz, Salzburg (AT); Rainer Burgstaller, Salzburg (AT)

(73) Assignee: RealNetworks, Inc., Seattle, WA (US)

( * ) Notice: Subject to any disclaimer, the term of this patent is extended or adjusted under 35 U.S.C. 154(b) by 264 days.

(21) Appl. No.: 10/861,133

(22) Filed: Jun. 4, 2004

(65) Prior Publication Data

US 2005/0021420 A1 Jan. 27, 2005

(30) Foreign Application Priority Data

Jun. 4, 2003 (EP) .................................. 03012731

(51) Int. Cl.
G06F 17/20 (2006.01)
G06F 15/16 (2006.01)

(52) U.S. Cl. .................. 707/736; 707/737; 707/752

(58) Field of Classification Search ............... 707/104.1
See application file for complete search history.

(56) References Cited

U.S. PATENT DOCUMENTS

| | | | |
|---|---|---|---|
| 5,571,997 A | | 11/1996 | Gray et al. |
| 5,749,081 A | * | 5/1998 | Whiteis ..................... 707/102 |
| 5,790,102 A | | 8/1998 | Nassimi |
| 6,108,493 A | | 8/2000 | Miller et al. |
| 6,118,431 A | | 9/2000 | Terrier et al. |
| 6,266,649 B1 | * | 7/2001 | Linden et al. ............... 705/26 |
| 6,438,579 B1 | * | 8/2002 | Hosken ..................... 709/203 |
| 6,993,532 B1 | * | 1/2006 | Platt et al. ................. 707/102 |
| 2001/0014868 A1 | * | 8/2001 | Herz et al. ................. 705/14 |
| 2002/0032019 A1 | | 3/2002 | Marks et al. |
| 2002/0068525 A1 | | 6/2002 | Brown et al. |
| 2002/0082901 A1 | * | 6/2002 | Dunning et al. ............. 705/10 |
| 2002/0104087 A1 | | 8/2002 | Schaffer et al. |
| 2002/0116291 A1 | | 8/2002 | Grasso et al. |
| 2002/0133247 A1 | | 9/2002 | Smith et al. |

(Continued)

FOREIGN PATENT DOCUMENTS

WO WO 01 06398 1/2001

(Continued)

OTHER PUBLICATIONS

Patent Abstracts of Japan, vol. 1998, No. 1, Jan. 30, 1998, JP 09-244801, Sep. 19, 1997.

*Primary Examiner*—John E Breene
*Assistant Examiner*—Alex Gofman
(74) *Attorney, Agent, or Firm*—Kory D. Christensen; Stoel Rives LLP

(57) ABSTRACT

The invention relates to a content recommendation device comprising a selection engine (2) that selects content items from a content item pool (4) and generates a selection list (9) comprising the selected content items, and/or means to receive a selection list The content recommendation device also comprises an arrangement engine (3) that generates a content recommendation list (12) by re-arranging at least a part of content items of the selection list (9) so that preferably a dramaturgic sequence of content items is generated.

45 Claims, 10 Drawing Sheets

U.S. PATENT DOCUMENTS

Figure 1:
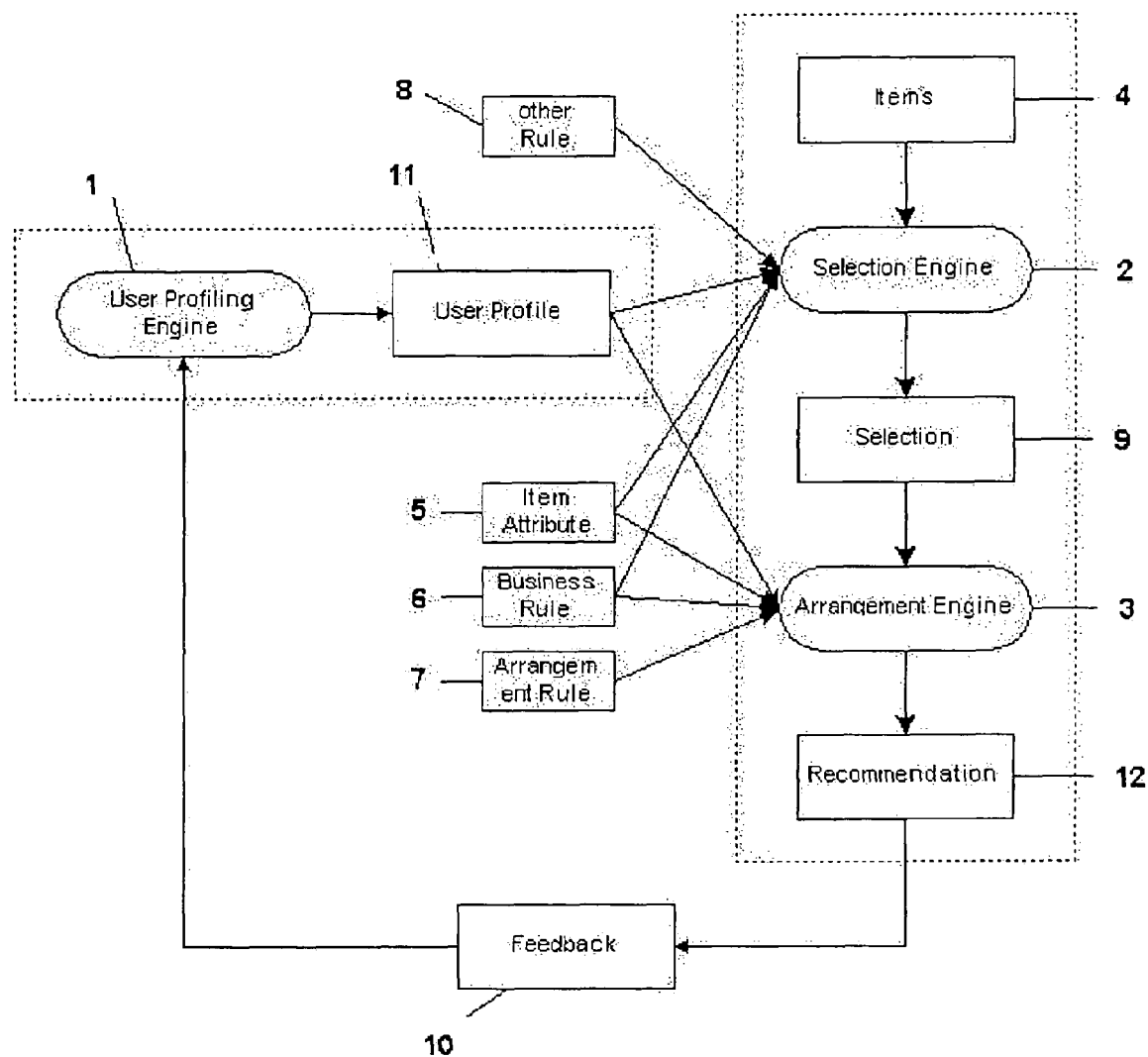

| | | |
|---|---|---|
| 2002/0138456 A1 | 9/2002 | Levy et al. |
| 2002/0139842 A1* | 10/2002 | Swaine ................ 235/379 |
| 2002/0178440 A1 | 11/2002 | Agnihotri et al. |
| 2003/0051240 A1 | 3/2003 | Schaffer et al. |
| 2003/0074447 A1 | 4/2003 | Rafey et al. |
| 2003/0126600 A1 | 7/2003 | Heuvelman |

FOREIGN PATENT DOCUMENTS

| | | |
|---|---|---|
| WO | WO 01 15449 | 3/2001 |
| WO | WO 01/35667 | 5/2001 |
| WO | WO 01/91417 | 11/2001 |
| WO | WO 02/03227 | 1/2002 |
| WO | WO 02/05140 | 1/2002 |

* cited by examiner

| User Profile |          |
|--------------|----------|
| Item         | Feedback | a)

| Item      |                 |
|-----------|-----------------|
| Attribute | Attribute Value | b)

| Attribute Value                  |
|----------------------------------|
| Value 1<br>Value 2<br>...<br>Value n | c)

Fig. 6

| Attribute Value - Genre | |
|---|---|
| | Pop |
| | Rock |
| | Jazz |
| | ... |
| | Classics |

| Item - SongA | |
|---|---|
| Genre | Pop |
| Popularity | Top 10 |
| Tempo | slow |
| Release Date | 03.02.1982 |
| Dynamics | Driving |
| Vocals | Vocals |
| Bars | 4/4 |
| ... | ... |
| Artist | Name |

| User Profile - User | |
|---|---|
| Song A | Title 0,7 |
| Song A | Artist 0,2 |
| Song B | Title -0,3 |
| Song B | Album -0,1 |
| Song C | Title 0,8 |
| Song D | Title -1 |

11a

Fig. 9

CONTENT RECOMMENDATION DEVICE WITH AN ARRANGEMENT ENGINE

The present invention is related to a content recommendation device and a method for content recommendation, in particular to an information and entertainment product for dynamic content delivery.

Networks have become ubiquitous these days. Telephone networks, computer networks, cellular networks are part of life. These networks, once separate entities, commingle to form means for the transport of data to any connected device.

The networks enable people access to data, data that informs and entertains. The problem for people is to find information and entertainment items that suit their information needs, their entertainment wants and their personal tastes.

In the domain area, so called recommendation systems are described to provide people with suggestions of information items that may get their appreciation.

These systems produce forecasts of information items a user may prefer based on
- User preferences (content based filtering)
- comparison of rated sample by individual user (correlation)
- Community recommendations (collaborative filtering)

The output of these systems is a list of items recommended to the user.

The systems known so far enable to generate a list of recommendations, which is output either in an arbitrary order or in an order according to the processing, i.e. a list of selections form a content item pool, which selection list is to inform the user, but not suited to entertain the user, preferably under consideration of his/her moods.

Therefore, it is the object underlying the present invention to provide an improved content recommendation system, i.e. device and method.

The content recommendation device, comprising a selection engine that selects content items from a content item pool and generates a selection list comprising the selected content items, and/or means to receive a selection list, according to the present invention additionally comprises an arrangement engine that generates a content recommendation list by re-arranging at least a part of content items of the selection list.

Correspondingly, the method for content recommendation, comprising the steps selecting content items from a content item pool and generating a selection list comprising the selected content items, and/or receiving a selection list, according to the present invention additionally comprises the step of generating a content recommendation list by re-arranging at least a part of content items of the selection list.

Therewith, the recommendation system according to the present invention is strongly enhanced in respect to the existing systems, since the selection list, which corresponds to the final output of the recommendation systems according to the prior art, is further processed according to the present invention. Such a further processing allows an easier adaptation of the final output recommendation result, i.e. the recommendation list, in respect to various considerations. With such an enabling of an arrangement of the selected content items individual information needs and entertainment wants can be satisfied.

According to the present invention, said content recommendation list is preferably generated based on arrangement rules that generate a dramaturgic sequence of content items. With such a re-arrangement of at least a part of the selection list, which is the output as the recommendation list, the problem of prior art recommendation systems that several very similar content items are proposed directly one after the other is overcome. This problem results from the way the selection list is generated, e.g. by calculating distances of content items to a user profile and then outputting a list with a predetermined number of content items in an increasing order beginning with the content item that shows the smallest distance.

According to the present invention, said content recommendation list is alternatively or additionally preferably generated based on item attributes that define every content item in a standardized way, in particular, said arrangement rules might combine individual item attributes. In this way the content of every arrangement rule might be particularly clearly structured so that an easy way to input and implement the arrangement rules is available.

According to the present invention, said content recommendation list is further alternatively or additionally preferably generated based on business rules that generate a commercially influenced sequence of content items. These business rules might relate to content item attributes as well as to commercial interests of the producer of the content items, i.e. might relate to static as well as dynamic properties of the content items.

According to the present invention, also said selection list is preferably based on item attributes that define every content item in a standardized way.

According to the present invention, said selection list based is additionally or alternatively preferably also based on business rules that generate a commercially influenced sequence of content items.

According to the present invention, said content recommendation list is further alternatively or additionally preferably based on a user profile.

According to the present invention, said content items are further alternatively or additionally preferably selected from a content item pool according to a user profile.

Therewith, the present invention enables that not only the selection of recommended content, but also the order thereof is determined according to well known and acknowledged mechanisms, such as item attributes and a user profile. Additionally, also business rules might be considered for the selection as well as the arrangement. The individual rules of one type might differ for selection and arrangement. Further, the arrangement rules according to the present invention that generate a dramaturgic sequence of the content items are additionally available for the re-arrangement of at least a part of the selection list for the generation of the recommendation list.

A content recommendation device according to the present invention preferably comprises a user profiling engine that generates a user profile based on a user feedback to at least one previously output recommendation list.

Correspondingly, the method according to the present invention preferably comprises the step of generating a user profile based on a user feedback to at least one previously output recommendation list.

According to the present invention, said user feedback preferably comprises explicit and implicit feedback.

Therewith, the recommendation system according to the present invention is further strongly enhanced in respect to the existing systems, since the consideration of explicit and implicit feedback as said user feedback, i.e. implicit feedback that relates to explicit feedback giver, enables to use very simple explicit feedback actions, e.g. 'like' and 'dislike', which might then be refined by the corresponding implicit feedback.

According to the present invention, further preferably said user feedback is a function of a representation of the explicit feedback weighted with a representation of the implicit feedback.

According to the present invention, said explicit feedback preferably comprises an indication whether a user likes or dislikes a particular content item. In this case measures are provided to easily detect the user's preferences in respect to a particular content item, e.g. a two-button touch screen. This particular simple form of user feedback encourages a user to actually give some feedback. Such a simple user feedback provides sufficient information and at the same time does not lead to an overweighting of the feedback to a group of closely related content items, e.g. in the sense of their distance, since the present invention implements a re-arrangement of the selection list.

According to the present invention, said implicit feedback is preferably based on the level of reaction accompanying the explicit feedback, further preferably on the intensity the user is operating an input terminal of the content recommendation device.

According to the present invention, said implicit feedback might comprise a pressure put on an explicit feedback control and/or a reaction time of a user to operate an explicit feedback control.

According to the present invention, preferably said user feedback is used to generate an iteratively refined recommendation list on basis of a reduced content item pool that comprises the content items of the selection list, or a new selection list. In this case on the one hand the user profile gets constantly refined and on the other hand the current situation of the user, e.g. his/her current mood, can easily be considered for the recommendations given. For example, with this feature a complete recommendation list might be exchanged in case the user indicated to dislike the first content item.

The computer program product according to the present invention comprises computer program means adapted to perform the method steps as set-out above when being executed on a computer, digital signal processor or the like.

The computer readable storage means according to the present invention stores thereon a computer program product according to the present invention.

The content recommendation device according to the present invention might be only used for the creation of recommendation lists, but it is preferred that the content recommendation device also delivers the content items to the user. Further, it is preferred that the content recommendation device according to the present invention is a part of a network that delivers the content items or, even the selection list and the corresponding content items. The content recommendation device according to the present invention might then be regarded as an information and entertainment product for dynamic, personalized and arranged content delivery, i.e. a content output device, which does not only propose content items to a user, but additionally to the searching for the content items also performs a sorting thereof, preferably based on user preferences and feedback to actually produce an output stream that is arranged in a dramaturgic way according to the users current needs and can be easily be consumed from the user while having the possibility to influence the future content items by providing a particular simple feedback to the currently delivered content items. The delivery medium for the content items may be any network, i.e. wired or wireless. Further, the content items may also be delivered to or displayed on any device, which then reproduces them based on the recommendation list generated according to the present invention. However, the content recommendation device according to the present invention might also store the content item pool within the device itself.

A particular preferred embodiment of the present invention in which all of the above features are combined enables recommendations of information and entertainment items to individual users of the system. The recommendations are based on user preferences, user feedback, i.e. user feedback from actual user and/or user feedback from other users of the system, content item attributes, e.g. meta data, and other content item information. Content items, in the following also just referred to as items, might be information and entertainment items.

The sequence of decisions made by the system according to this preferred embodiment of the invention forms a causal feedback loop comprising: Recommendation—Feedback—User Profile—Selection—Arrangement—Recommendation.

Items recommended to a user in this way are first selected among all available items. Second, the items are arranged.

The selection of the items is based on user feedback, meta data and other information. Other information may be business rules to influence item selection and other rules.

Arrangement of the items stands for arranging the selected items in a dramaturgic way. For arrangement of items, arrangement rules are defined. The arrangement rules are influenced by meta information and other information such as business rules.

After selection and arrangement a recommendation is presented to the user.

The user feedback within the recommendation procedure of this preferred embodiment is achieved by implicit and explicit feedback. Explicit feedback is gathered by collecting rating information on an item based on two values, e.g. 1 and −1. A feedback of value 1 expresses appreciation of the information and entertainment item by the user, i.e. 'like'. A value of −1 does stand for rejection of the content item by the user, i.e. 'dislike'. Implicit feedback is gathered by the level of reaction accompanying the explicit feedback.

The reaction is a measure for the intensity the user is operating the input device or terminal. For example, the pressure put on an explicit feedback control or the reaction time of a user to operate the explicit feedback control.

Figure 2:
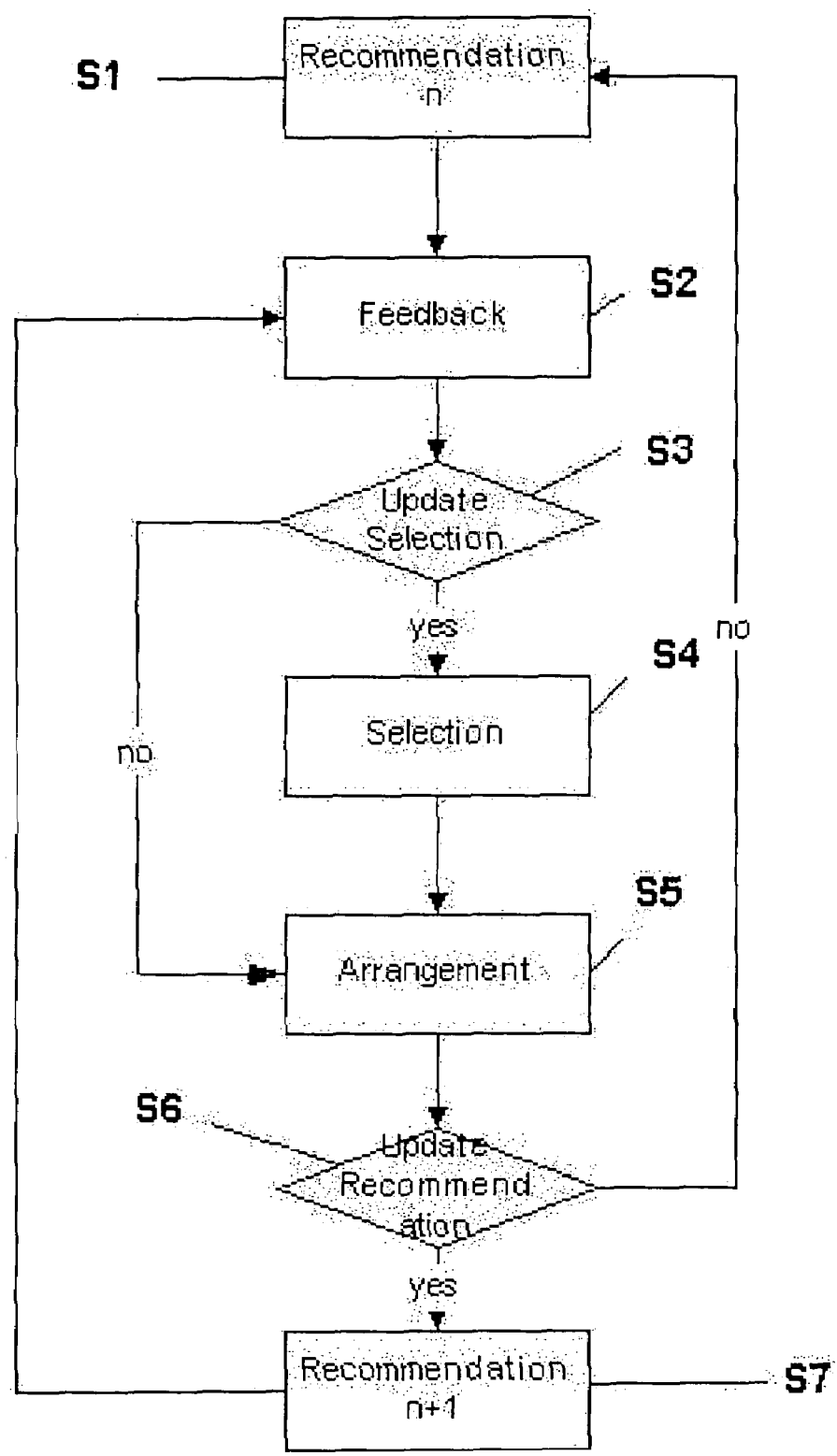
Figure 3:
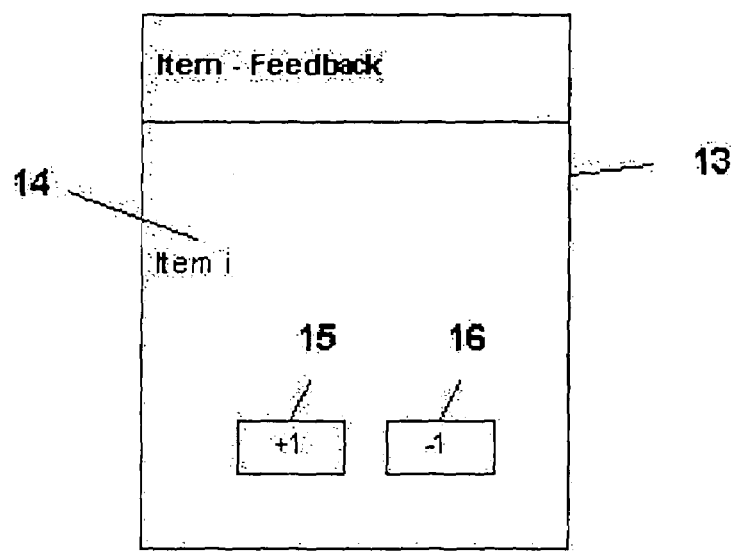
Figure 4:
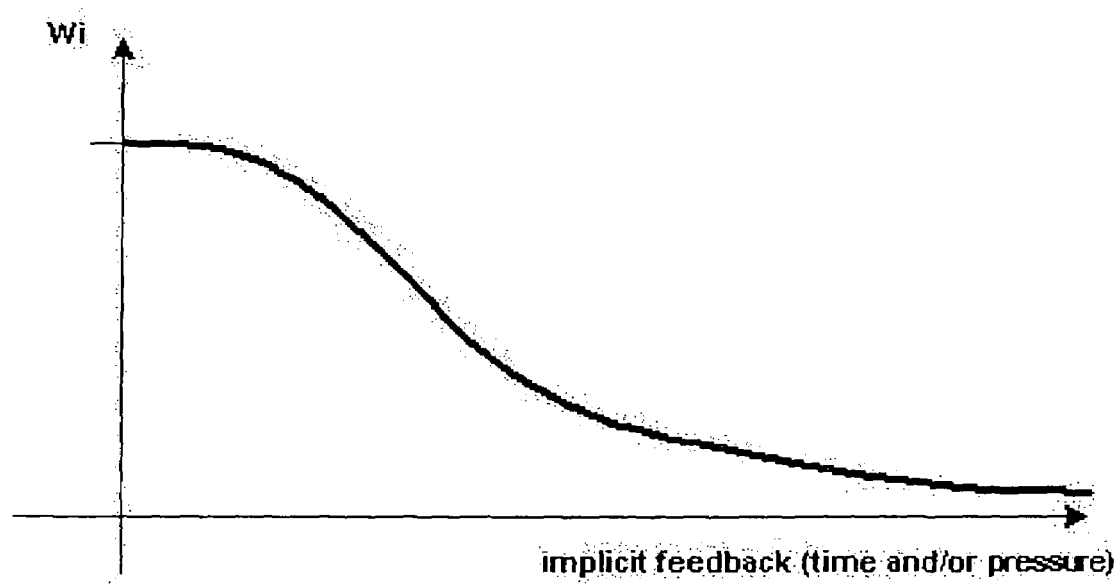
Figure 5:
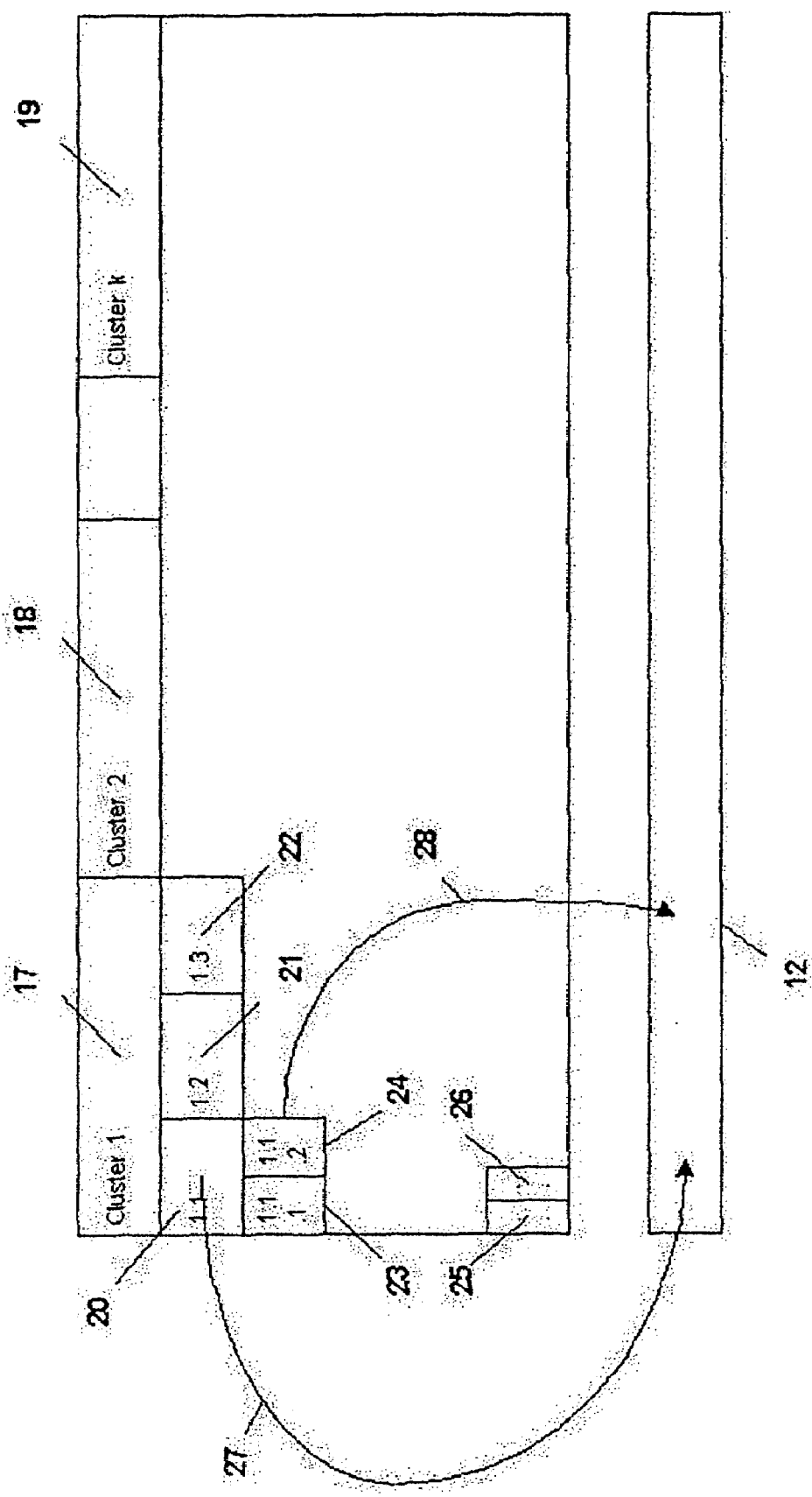
Figure 7:
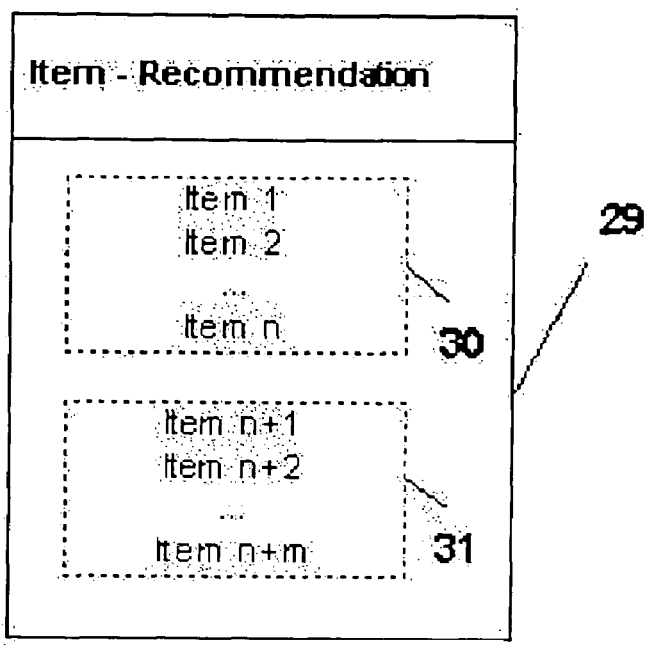
Figure 8:
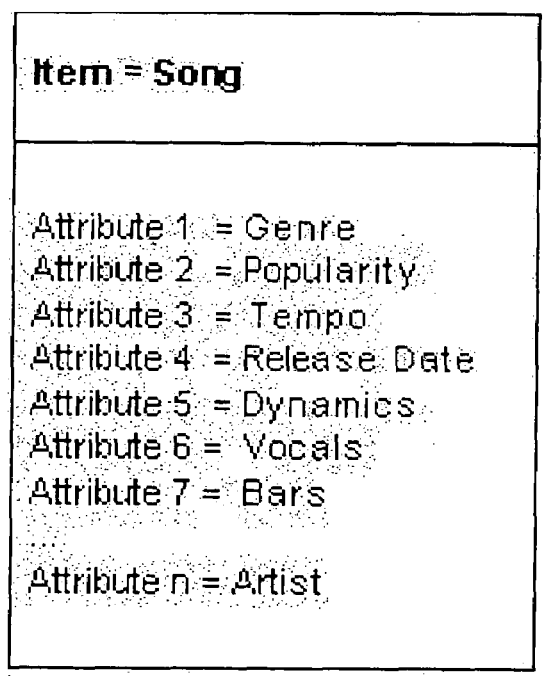
Figure 10:
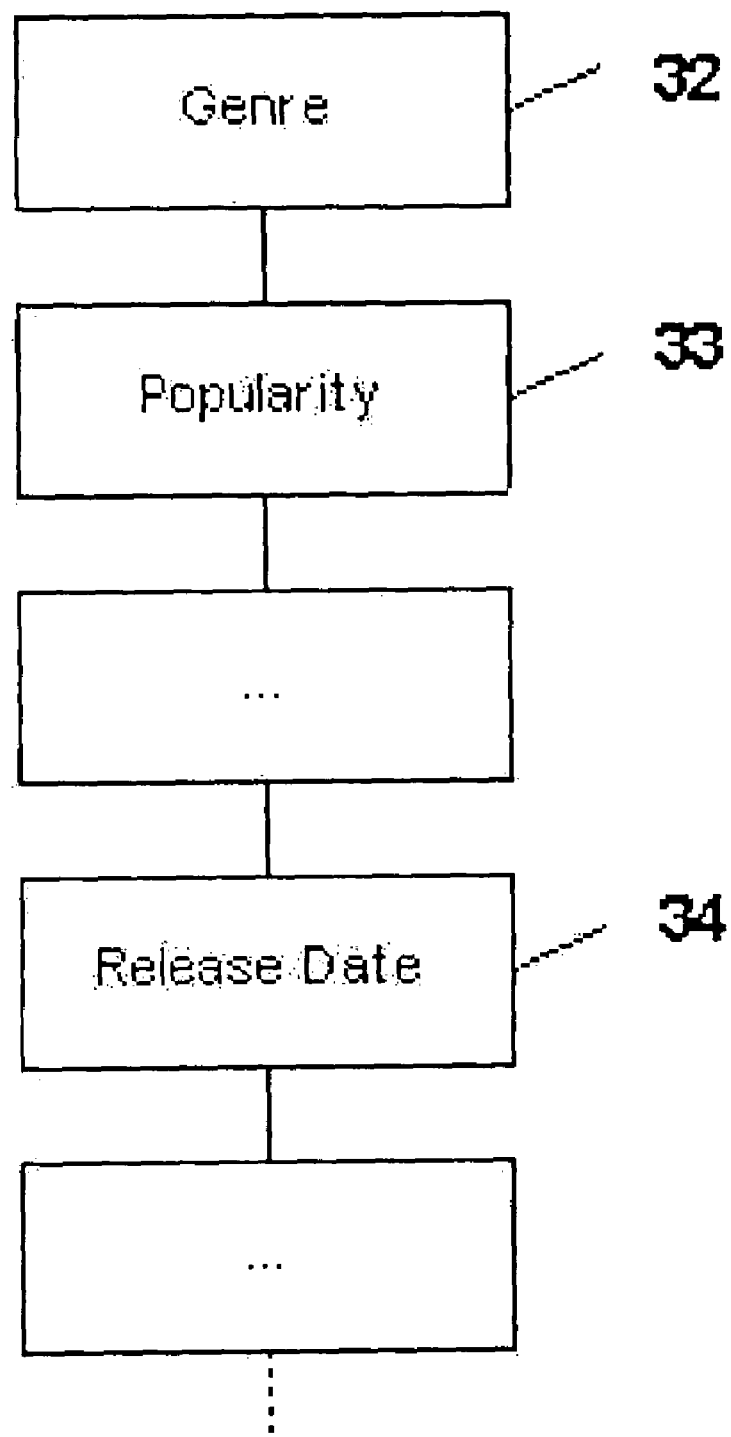
Figure 11:
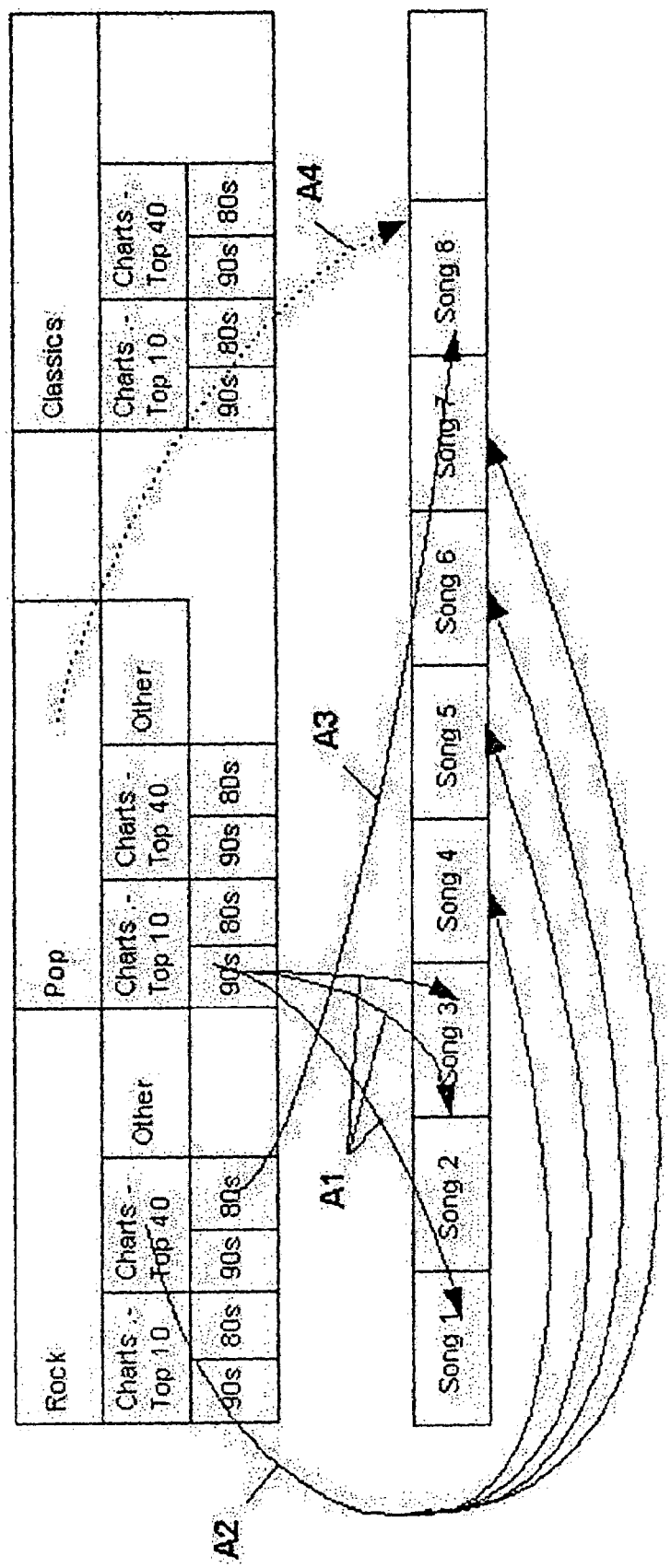
Figure 12:
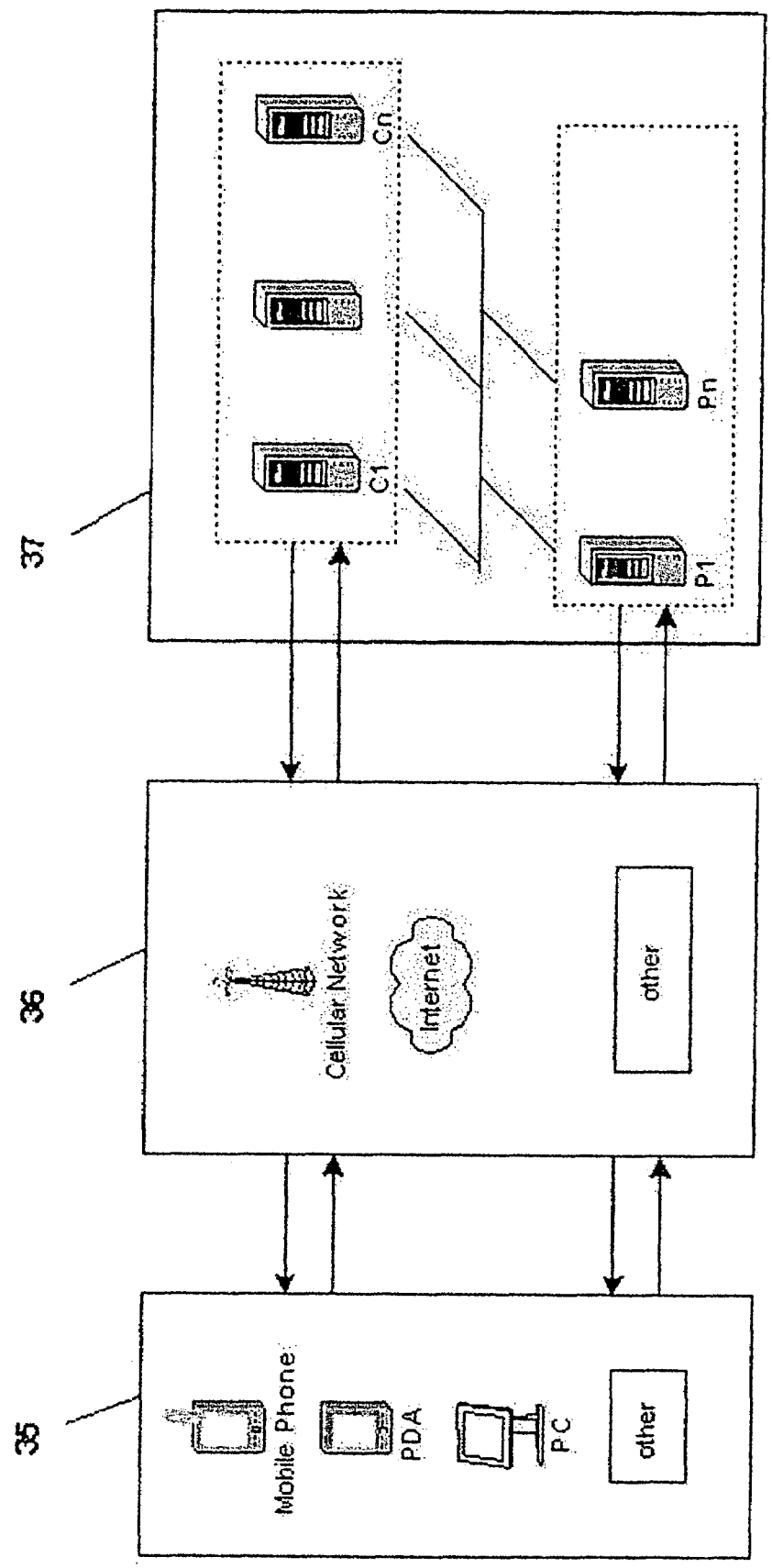

For a better understanding of the invention and to further elucidate the invention, its features, objects and advantages, the above outlined preferred embodiment is described in detail by way of example while making reference to the accompanying drawing, wherein:

FIG. 1 shows a block diagram of the preferred embodiment of the present invention showing the individual components for item recommendation and factors influencing recommendation, FIG. 2 shows a flow chart giving an overview of the process flow that describes selection and arrangement of items including user feedback according to the preferred embodiment of the present invention, FIG. 3 shows an exemplary feedback input terminal according to the preferred embodiment of the present invention, FIG. 4 shows a correlation chart exemplary describing the effect of an implicit feedback mechanism on feedback, which consists of implicit and explicit feedback, according to the preferred embodiment of the present invention, FIG. 5 shows a general clustering scheme to build a basis for the re-arrangement of the items within the selection list to generate the recommendation list according to the preferred embodiment of the present invention, FIG. 6 shows an example that shows the structure of a basic user profile, an item, and attribute values according to the preferred embodiment of the present invention, FIG. 7 shows a generated recommendation list according to the preferred embodiment of the present invention, FIG. 8 shows an example of an item and its related attributes according to the preferred embodiment of the present invention, FIG. 9 shows an example that shows the structure of an exemplary user profile, item, and attribute values according to the preferred embodiment of the present invention, FIG. 10 shows an example of a priority list of item attributes according to the preferred embodiment of the present invention, FIG. 11 shows an exemplary clustering to re-arrange the items within the selection list to generate the recommendation list according to the preferred embodiment of the present invention, and FIG. 12 shows a possible system architecture within which the recommendation device/system according to the preferred embodiment of the present invention is installed.

The exemplary described preferred embodiment of the invention is an information and entertainment device for dynamic, personalized and arranged content delivery.

Content does refer to any information and entertainment item in one media format or the combination of multiple media formats. Media Formats may be audio, video, images, pictures and text. One piece of content, e.g. one song, one news article, one movie, etc., is generally referred to as an item.

The invention comprises multiple components that enable dynamic, personalized delivery of items to a user of the system.

FIG. 1 is an overview of the system components of the information and entertainment system according to the present invention. FIG. 1 shows the components of the system, and the input to and output of the system.

The components of the system are a user profile engine 1, a selection engine 2, and an arrangement engine 3.

Inputs to the system components are items 4, item attributes 5, business rules 6, arrangement rules 7, other rules 8, a selection 9, feedback 10, and a user profile 11.

Outputs of the system components are the selection 9, a recommendation 12, and the user profile 11.

The system components and their inputs and outputs are linked as follows:

The items 4 serve as a content item pool. They might be located within the recommendation device according to the present invention or accessible thereto, e.g. on an item server.

The selection engine 2 can access the items 4 to produce the selection 9, i.e. the selection list and/or the corresponding content items. Also the selection engine 2 can be arranged within the recommendation device according to the present invention or outside thereof, as long as it is secured that the selection 9 output by the selection engine 2 is accessible by the arrangement engine 9 of the content recommendation device according to the present invention. The selection engine 2 generates the selection 9 by selecting a predetermined number of the items 4 according to the item attributes 5, the user profile 11, the business rules 6, and the other rules 8.

The arrangement engine 3, which is arranged within the recommendation device according to the present invention, can access the selection 9 and generates the recommendation 12, i.e. the recommendation list and/or the corresponding content items. This generation is based on the arrangement rules 7, the item attributes 5, the user profile 11, and the business rules 6.

Based on the output recommendation 9 the user gives feedback 10 to the user profiling engine 1, which generates the user profile 11 therefrom.

While there are multiple outputs of system components, one output is of most importance—the recommendations 12. The recommendations 12 are arranged items presented to a user based on the system's assumptions that they suit the users information needs entertainment wants and tastes, i.e. the above referenced recommendation list. In the described exemplary embodiment of the present invention the recommendations 12 are personalized.

The recommendations 12 are presented to the user. The user has the ability to interact with the system by giving feedback 10 to the system. The feedback 10 given does influence future item recommendations 12 and/or item selections 9.

The effect is that the system components utilizing the input learn to predict the user wants over time based on user feedback.

FIG. 2 describes the combination of outputs and feedback over time.

In a first step S1 a user is presented with a recommendation 9, exemplary indicated as recommendation number n. The user gives feedback 10 to the individual items of the recommendation 9 in a following second step S2. This feedback 10 might be directed to all recommendation items of the recommendation 9 or to just a part thereof, e.g. only to a currently reproduced recommendation item. In a following third step S3 it is decided whether or not a new selection 9 should be generated based on the feedback 10. If a new selection 9 should be generated, the process continues with a fourth step S4 in which said task is performed. The selection 9 comprises items that may suit the users wants. In case it is decided in the third step S3 that the current selection should not be updated, this fourth step S4 gets skipped. To improve the list presented to the user, in a following fifth Step S5 (following after the fourth step S4 or, in case the fourth step S4 is skipped, directly after the third step S3) a new recommendation 12 is generated, i.e. a recommendation number n+1. The new recommendation 12 may be close to the existing recommendation, i.e. the recommendation number n. Based on the distance of recommendation n+1 to recommendation n, the system chooses whether or not to update the recommendation 12 in a following sixth step S6. In case the distance is below a certain threshold, the process returns to the first step S1, otherwise the process continues with a seventh step S7 in which recommendation n+1, which comprises the new list of information and entertainment items, gets presented to the user who can then continue the process with the second step S2, i.e. giving his feedback 10 to the recommendation number n+1 so that a recommendation number n+2 . . . can be generated.

The distance of recommendations 12 might be calculated based on the distances of the item attributes 5 of the single recommendation items within the recommendations 12.

The feedback 10 is essential for the ability of the system to adapt to the users reactions. Feedback 10 to the system may be given in two ways, namely as explicit feedback and as implicit feedback.

Explicit feedback is a conscious reaction of the user to one of the items within a recommendation 12. Implicit feedback is an unconscious reaction of the user of the system.

FIG. 3 shows a schematic representation of a system dialogue. The user is presented with the ability to give feedback to one item recommended, e.g. an item number i which is currently reproduced. The shown feedback input terminal 13 displays the item i 14, a first input button 15 for a positive feedback 10, i.e. 'like', and a second input button 16 for a negative feedback 10, i.e. 'dislike'. An enhanced dialogue may be a preferred embodiment to give users the ability to give feedback on a specific item attribute of the item in the recommendation as well as feedback to the item in general.

By pressing one of the input buttons 15, 16 on the dialogue, a user gives his appreciation or denial to the item presented. In other words, the user gives feedback whether he/she likes or dislikes the item number i in the recommendation 12.

Feedback 10 according to this preferred embodiment of the invention, however, comprises implicit and explicit feedback 10. Implicit feedback is feedback gathered about unconscious behaviour of the user. Unconscious behaviour is any user reaction that can be measured on a device that is capable of displaying a system dialogue or on a device used to input the user feedback 10 into the system.

An example for implicit feedback might be the time it takes from the time the user is presented the recommended item, e.g. a song starts playing, until a user takes action by an explicit feedback, e.g. pressing 'like' or 'dislike'. Another example for implicit feedback might be the pressure a user exaggerates on the input buttons 15, 16 in the system dialogue 13.

A function F of the feedback is then a combination of implicit and explicit feedback. Explicit feedback according to the preferred embodiment of the invention is a one of two discrete values (e.g.: 1/−1). Implicit Feedback is considered as a weighting factor.

$$F = wi * Fe$$

Fe ... explicit feedback
Wi ... weighting factor

The weighting factor is dependent on the implicit feedback given. FIG. 4 represents one possible correlation between implicit user feedback and weighting factor in which the weighting factor Wi decreases in a non-linear manner over time and/or pressure.

Therewith, according to the present invention feedback is not given based on rating of one item on a flexible scale such as 1-5 or 0-100, but just as one of two discrete values, e.g. +1/−1 (like/dislike), which explicit feedback is enhanced by the implicit feedback relating to the explicit feedback given. When a user is e.g. listening to songs a song, an artist or an album may be rated in such a way.

The arrangement engine 3 according to the preferred embodiment of the present invention is responsible for arranging the information and entertainment items available in the selection 9 in a dramaturgic way.

The arrangement engine 3 re-arranges the items of the selection 9 and generates the recommendation 12. First, the arrangement engine 3 generates a number of k clusters of items. Second, arrangement rules 7 are applied to create a sorted list of items that becomes the recommendation 12. Third, business rules 6 may be applied to influence the recommendation 12.

In the preferred embodiment of the invention, the basis for the clustering are item attributes 5: The arrangement rules 7 are based on item attributes 5 and arrange the items in a certain sequence. The business rules 6 are applied afterwards. The business rules 7 are also based on item attributes 5 as well.

Any individual item attribute 5 may be selected to start with the clustering process. A cluster is a number of items of the selection with the same attribute values of the selected individual attribute.

FIG. 5 elucidates this clustering process in general. Based on the selected item attribute 5 a number k of clusters 17, 18, 19 is generated, namely a first cluster 17 for the attribute 'value 1', a second cluster 18 for the attribute 'value 2', ... and a $k^{th}$ cluster 19 for the attribute 'value k'. The number k of clusters thus depends on the number of different attribute values for the item attribute selected for the clustering.

Within each cluster a following clustering in respect to another individual item attribute is performed to generate a predetermined number of first order sub-clusters 20, 21, 22, namely for the first cluster 17 a first first order sub-cluster 20, a second first order sub-cluster 21, and a third first order sub-cluster 22. The number of first order sub-clusters depends on the number of different item attribute values of the other individual item attribute within the respective cluster.

Within each first order sub-cluster a following clustering in respect to a further individual item attribute is performed to generate a predetermined number of second order sub-clusters 23, 24, namely for the first first order sub-cluster 20 a first second order sub-cluster 23 and a second second order sub-cluster 24. The predetermined number of second order sub-clusters depends on the number of different item attribute values of the further individual item attribute within the respective first order sub-cluster.

Such a clustering is performed until finally all individual item attributes are used and $(o-1)^{th}$ order sub-clusters 25, 26 are generated for the o different individual item attributes. The number of generated clusters or sub-clusters always depends on the number of different item attribute values of the respective individual item attribute within the respective cluster higher order part of the selection, i.e. for the clustering the whole selection and for the sub-clustering the part of the selection that gets sub-clustered.

The arrangement rules 7 then define how many items of which cluster, first order sub-cluster, second order sub-cluster, ... are taken to generate the recommendation 12, e.g. first as shown with a first arrow 27 a certain number of items of the first first order sub-cluster 20, which then consist of a certain number of items within the second second order sub-cluster 24, as indicated by a second arrow 28.

FIG. 6 elucidates the structure of the user profile, the items and the attribute values. FIG. 6a) shows that the user profile consists of items with associated feedback, FIG. 6b) shows that each item consists of item attributes with associated attribute value, and FIG. 6c) shows that each attribute value consists of a certain one of values 1 ... n (e.g. so as to generate a predetermined number n of clusters or sub-clusters).

The arrangement engine 3 is afterwards commanded to arrange a number of l items to become a recommendation 12 as roughly indicated above.

Arrangement rules 7 are applied. The arrangement rules 7 are specific rules. All of them can be described in a generic form.

Select x items of a specific cluster/sub-cluster.

A series of arrangement rules 7 are the basis for arrangement. For example: The arrangement engine 3 is asked to create a recommendation of 15 items. Then, a first arrangement rule may define to select the number of 5 items of cluster 1.1.1. A second rule may say to select 7 items of cluster 2.1. A third rule may command to select 3 items of cluster 4.

Business rules 6 may influence the way individual items are picked from a single cluster.

The output of the arrangement engine 3 is the recommendation 12.

The recommendation 12 is a list of items offered to the user. The recommendation 12 according to this preferred embodiment of the invention has two sections. One section is visible to the user of the information and entertainment device, the other section is hidden.

Further, two cases of recommendations have to be distinguished.

The initial recommendation (recommendation n in FIG. 2)
Future recommendations (recommendation n+1 in FIG. 2)

For the first recommendation, i.e. the initial recommendation, the selection engine 9 is responsible for selecting the items of the total number of items available in the item pool within the or accessible to the information and entertainment product. The arrangement engine 3 does arrange the items in a special order, e.g. according to an assumed user profile of a general user or according to a special group of users that is assumed to use the device according to the invention, and is responsible for putting forward n+m selected items, i.e. a first group 31 of items, as shown in FIG. 7. Of the n+m items supposed suitable for the user, only item 1 to item n, i.e. a second group 30 of items, is visible on a terminal 29 to the user.

A user may give feedback 10 to item 1 to item n. When feedback is given, the recommendation 12 may be modified as elucidated above and in the following.

The feedback 10 influences future recommendations. The feedback given however influences only the section not visible to the user of the system. While the arrangement engine 3 suggests n+m items in the initial recommendation, in future recommendations the arrangement engine 3 suggests m items in order to keep the number of recommendations constant.

Once the user has consumed the information or entertainment device to his satisfaction, the item consumed (one item of item 1 to item n), the item is removed from the recommendation. The first item from the invisible section of the recommendation becomes visible.

In the following an example describes an audio case comprising recommendation of information and entertainment items of audio data, text data, still image data.

In the following the functionality of the arrangement engine 3 is exemplary explained. The example assumes that the entertainment item is audio content, more specifically, the entertainment item is a song.

The song is described with a number of item attributes 5, e.g. as shown in FIG. 8 the first item attribute might be 'genre', the second item attribute might be 'popularity', the third item attribute might be 'tempo', the fourth item attribute might be 'release date', the fifth item attribute might be 'dynamics', the sixth item attribute might be 'vocals', the seventh item attribute might be 'bars', . . . , and the $n^{th}$ item attribute might be 'artist'.

As shown in FIG. 1, the user profile 11 is an input to the arrangement engine 3. A user profile 11 is gathered by collecting user feedback 10 from the user. FIG. 9 shows an example user profile 11a in this audio case. It is assumed that in this case a user may give feedback to an individual song in the recommendation to either the title of the song (the user likes/dislikes the specific song title), the artist (the user likes/dislikes the artist performing the song) or album (the user likes/dislikes the audio compilation the song is part of in a commercial distribution).

In connection with FIGS. 3 and 4 the implicit and explicit feedback mechanism is described. FIG. 9 shows an example of the storage of the feedback 10 within the user profile 11a.

Any one of the feedback given—title, artist, album—may be used for arrangement. In the following the feedback based on 'Title' is described for this audio case.

FIG. 9 shows that the user profile stores the feedback 'Title 0.7' and 'Artist 0.2' for 'Song A', 'Title −0.3' and 'Album −0.1' for 'Song B', 'Title 0.8' for 'Song C', and 'Title −1' for 'Song D'.

Therefore, the user profile 11a indicates that Song A and Song C is appreciated by the user, whereas the user dislikes songs B and D.

All songs are described by item attributes. In FIG. 9 an example for such a description of 'Song A' is given. 'Song A' is described by the item attributes 'Genre' with the value 'Pop', 'Popularity' with the value 'Top 10' standing for the fact that the song was in the charts among the top 10, 'Tempo' with the value 'slow', 'Release Date' with the value '03.02.1982', 'Dynamics' with the value 'Driving', 'Vocals' with the value 'Vocals', 'Bars' with the value '4/4', and 'Artist' with the value 'Name'. Of course, other item attributes might additionally be used.

In this audio case another simplification is made. In this described case only the attribute value 'Genre' is influenced by the User Profile. Of course, also all other vales might be influenced as well.

The input of the user profile 11a to the arrangement engine 3 is therefore that the User that likes Song A with the item attribute 'Genre' of value 'Pop' and likes Song C with the item attribute 'Genre' of Value 'Pop'.

FIG. 10 exemplary lists the item attributes 5 which might influence the arrangement. The priority for the arrangement is from top to bottom, i.e. genre 32 is the most important factor for influencing song selection, followed by popularity 33, others, the release date 34, and again others in the described example.

Based on the item attributes 5 and the user profile 11a the clusters and subclusters generally described in connection with FIG. 5 are created.

FIG. 11 describes the clusters and subclusters in this example.

According to FIG. 10, first a cluster of items according to the attribute 'Genre' is created. There are as many clusters created as item attributes values according to FIG. 9 are available, which shows that for the item attribute 'Genre' the values 'Pop', 'Rock', 'Jazz', 'Classics' and others are available. In this example, each cluster is further divided into separate entities by the item attribute 'Popularity' according to FIG. 10, which might have the values 'Top 10' 'Top 40', and 'Other'. Furthermore a third item attribute 'Release Date' that might have the values '90s' and '80s' is used to create the second order subclusters, e.g. Pop Songs that have been in the Top 10 in the 90s and 80s.

Once, the arrangement engine 3 has completed the clustering, the arrangement rules 7 are applied. The arrangement rules 7 in this example are: First select 3 songs from the users most popular genre (pop) that have been in the Charts (Top 10) in the 90s, as indicated by A1 in FIG. 11. Second, select 4 songs from a genre close to the users most popular genre that have been in the charts (Top 40), as indicated by A2 in FIG. 11. Third, if the user likes the songs recommended in the previous step, then select one song from the 80s in the cluster rock that has been in the charts (Top 40), as indicated by A3 in FIG. 11. If the user does not like the songs presented, then select a song from the cluster Pop, as indicated by A4 in FIG. 11.

In this way, the recommendation list is generated with 8 songs as a feedback loop comprising Recommendation—Feedback—User Profile—Selection—Arrangement—Recommendation.

FIG. 12 shows a possible system architecture within which the recommendation device/system according to the preferred embodiment of the present invention is installed. The recommendation device 35 might be a mobile phone, a PDA, a PC or another suited device. The recommendation device 35 communicates via a network 36, which might be a cellular network, the internet or another suited network, with a server side 37, which might comprise networked server computers. Depending on the implementation, the server side 37 might serve as content item pool 4 or even deliver the selections 9.

Therewith, it can generally be summarized that the invention relates to a content recommendation device comprising a selection engine 2 that selects content items from a content item pool 4 and generates a selection list 9 comprising the selected content items, and/or means to receive a selection list The content recommendation device also comprises an arrangement engine 3 that generates a content recommendation list 12 by re-arranging at least a part of content items of the selection list 9 so that preferably a dramaturgic sequence of content items is generated.

The invention claimed is:

1. A content recommendation device, comprising:
 a processor;
 a computer readable storage medium;
 a selection engine configured to select songs and/or videos from a pool and generate a selection list including the selected songs and/or videos, each song and/or video being associated with one or more song and/or video attributes having a number of possible values, or means for receiving a selection list including selected songs and/or videos, each song and/or video being associated with one or more song and/or video attributes having a number of possible values; and
 an arrangement engine configured to generate a content recommendation list by:
  generating a plurality of clusters of songs and/or videos, each cluster being comprised of songs and/or videos sharing a different respective value for a first song and/or video attribute;
  generating, within each cluster, a plurality of sub-clusters of songs and/or videos, each sub-cluster being comprised of songs and/or videos sharing a different respective value for a second song and/or video attribute;
  selecting, based on arrangement rules, a sequence of songs and/or videos from both at least one cluster and at least one sub-cluster to include in the content recommendation list, wherein the sequence defines an order in which the respective songs and/or videos are played back to a user, and wherein the arrangement rules define:
   an order in which to access the at least one cluster and the at least one sub-cluster during selection of the sequence, wherein the order defines accessing a first cluster or sub-cluster before accessing a second cluster or sub-cluster;
   how many songs and/or videos to select from the first cluster or sub-cluster before accessing the second cluster or sub-cluster; and
   how many songs and/or videos to select from the second cluster or sub-cluster, wherein the rules specify that two or more songs and/or videos are selected from at least one of the first cluster or sub-cluster and the second cluster or sub-cluster; and
  providing arranged content delivery by outputting a stream of songs and/or videos arranged in the selected sequence, wherein the stream is configured to be sequentially reproduced in the arranged order.

2. The content recommendation device according to claim 1, wherein said arrangement engine generates said content recommendation list based on said arrangement rules such that said sequence comprises a dramaturgic sequence of songs and/or videos.

3. The content recommendation device according to claim 1, wherein said arrangement engine generates said content recommendation list based on song and/or video attributes that define every song and/or video in a standardized way.

4. The content recommendation device according to claim 2, wherein said arrangement rules combine individual song and/or video attributes.

5. The content recommendation device according to claim 1, wherein said arrangement engine generates said content recommendation list based on business rules that generate a commercially influenced sequence of songs and/or videos.

6. The content recommendation device according to claim 1, wherein said selection engine generates said selection list based on song and/or video attributes that define every song and/or video in a standardized way.

7. The content recommendation device according to claim 1, wherein said selection engine generates said selection list based on business rules that generate a commercially influenced sequence of songs and/or videos.

8. The content recommendation device according to claim 1, wherein said arrangement engine generates said content recommendation list based on a user profile.

9. The content recommendation device according to claim 8, wherein said user feedback is used to generate an iteratively refined recommendation list on basis of a reduced content item pool that includes the songs and/or videos of the selection list, or a new selection list.

10. The content recommendation device according to claim 1, wherein said selection engine selects the songs and/or videos from a pool according to a user profile.

11. The content recommendation device according to claim 1, further comprising:
 a user profiling engine configured to generate a user profile based on a user feedback to at least one previously output recommendation list.

12. The content recommendation device according to claim 11, wherein said user feedback includes explicit and implicit feedback.

13. The content recommendation device according to claim 12, wherein said user feedback is a function of a representation of the explicit feedback weighted with a representation of the implicit feedback.

14. The content recommendation device according to claim 12, wherein said explicit feedback includes an indication whether a user likes or dislikes a particular song and/or video.

15. The content recommendation device according to claim 12, wherein said implicit feedback is based on the level of reaction accompanying the explicit feedback.

16. The content recommendation device according to claim 15, wherein said implicit feedback is based on the intensity the user is operating an input terminal of the content recommendation device.

17. The content recommendation device according to claim 15, wherein said implicit feedback includes a pressure put on an explicit feedback control.

18. The content recommendation device according to claim 15, wherein said implicit feedback includes a reaction time of a user to operate an explicit feedback control.

19. The content recommendation device according to claim 1, wherein the number of clusters is equal to the number of different possible values for the first attribute.

20. The content recommendation device according to claim 1, wherein the number of sub-clusters is equal to the number of different possible values for the second attribute.

21. The content recommendation device according to claim 1, wherein each of the plurality of sub-clusters comprises a first order sub-cluster, the method further comprising:
generating, within each first order sub-cluster, a plurality of second order sub-clusters of songs and/or videos, each second order sub-cluster being comprised of songs and/or videos sharing a different respective value for a third song and/or video attribute.

22. The content recommendation device according to claim 21, further comprising:
selecting, based on one or more arrangement rules, a number of songs and/or videos to include in the content recommendation list from at least one second order sub-cluster in addition to the songs and/or videos selected from the at least one cluster and the at least one first order sub-cluster.

23. The content recommendation device according to claim 1, further comprising:
generating, within each $N^{th}$ order sub-cluster, a plurality of $(N+1)^{th}$ order sub-clusters of songs and/or videos, each $(N+1)^{th}$ order sub-cluster being comprised of songs and/or videos sharing a different respective value for an $(N+2)^{th}$ song and/or video attribute.

24. The content recommendation device according to claim 23, wherein the generating of $(N+1)^{th}$ order sub-clusters repeats until $(O-1)^{th}$ order sub-clusters are generated, where O equals the number of individual song and/or video attributes.

25. The content recommendation device according to claim 1, wherein at least one arrangement rule relies on information from a user profile to determine whether to select a song and/or video from a particular Nth order sub-cluster.

26. The content recommendation device according to claim 1, wherein at least one arrangement rule relies on an indication of whether the user liked or disliked a previously presented song and/or video to determine whether to select a song and/or video from a particular Nth order sub-cluster.

27. A method of content recommendation, comprising:
selecting songs and/or videos from a content item pool and generating a selection list of the selected songs and/or videos, each song and/or video being associated with one or more song and/or video attributes having a number of possible values, or receiving a selection list including selected songs and/or videos, each song and/or video being associated with one or more song and/or video attributes having a number of possible values;
generating a plurality of clusters of songs and/or videos, each cluster being comprised of songs and/or videos sharing a different respective value for a first song and/or video attribute;
generating, within each cluster, a plurality of sub-clusters of songs and/or videos, each sub-cluster being comprised of songs and/or videos sharing a different respective value for a second song and/or video attribute;
selecting, based on arrangement rules, a sequence of songs and/or videos from both at least one cluster and at least one sub-cluster to include in a content recommendation list, wherein the sequence defines an order in which the respective songs and/or videos are played back to a user, and wherein the arrangement rules define:
an order in which to access the at least one cluster and the at least one sub-cluster during selection of the sequence, wherein the order defines accessing a first cluster or sub-cluster before accessing a second cluster or sub-cluster;
how many songs and/or videos to select from the first cluster or sub-cluster before accessing the second cluster or sub-cluster; and
how many songs and/or videos to select from the second cluster or sub-cluster, wherein the rules specify that two or more songs and/or videos are selected from at least one of the first cluster or sub-cluster and the second cluster or sub-cluster; and
providing arranged content delivery by outputting a stream of songs and/or videos arranged in the selected sequence, wherein the stream is configured to be sequentially reproduced in the arranged order.

28. The method according to claim 27, wherein generating said content recommendation list is based on said arrangement rules such that said sequence comprises a dramaturgic sequence of songs and/or videos.

29. The method according to claim 28, further comprising:
combining individual song and/or video attributes with said arrangement rules.

30. The method according to claim 27, wherein generating said content recommendation list is based on song and/or video attributes that define every song and/or video in a standardized way.

31. The method according to claim 27, wherein generating said content recommendation list is based on business rules that generate a commercially influenced sequence of songs and/or videos.

32. The method according to claim 27, wherein generating said selection list is based on song and/or video attributes that define every song and/or video in a standardized way.

33. The method according to claim 27, wherein generating said selection list is based on business rules that generate a commercially influenced sequence of songs and/or videos.

34. The method according to claim 27, wherein generating said content recommendation list is based on a user profile.

35. The method according to claim 27, wherein selecting the songs and/or videos from a content item pool is according to a user profile.

36. The method according to claim 27, wherein generating a user profile is based on a user feedback to at least one previously output recommendation list.

37. The method according to claim 36, wherein said user feedback includes explicit and implicit feedback.

38. The method according to claim 37, wherein user feedback is a function of a representation of the explicit feedback weighted with a representation of the implicit feedback.

39. The method according to claim 37, wherein said explicit feedback includes an indication whether a user likes or dislikes a particular song and/or video.

40. The method according to claim 37, wherein said implicit feedback is based on the level of reaction accompanying the explicit feedback.

41. The method according to claim 40, wherein said implicit feedback is based on the intensity the user is operating an input terminal of the content recommendation device.

42. The method according to claim 40, wherein said implicit feedback includes a pressure put on an explicit feedback control.

43. The method according to claim 40, wherein said implicit feedback includes a reaction time of a user to operate an explicit feedback control.

44. The method according to claim 36, wherein said user feedback is used to generate an iteratively refined recommendation list on basis of a reduced content item pool that includes the songs and/or videos of the selection list, or a new selection list.

45. A computer readable storage medium including computer program instructions stored thereon that cause a computer to execute a method of content recommendation comprising:

selecting songs and/or videos from a content item pool and generating a selection list of the selected songs and/or videos, each song and/or video being associated with one or more song and/or video attributes having a number of possible values, or receiving a selection list including selected songs and/or videos, each song and/or video being associated with one or more song and/or video attributes having a number of possible values;

generating a plurality of clusters of songs and/or videos, each cluster being comprised of songs and/or videos sharing a different respective value for a first song and/or video attribute;

generating, within each cluster, a plurality of sub-clusters of songs and/or videos, each sub-cluster being comprised of songs and/or videos sharing a different respective value for a second song and/or video attribute;

selecting, based on arrangement rules, a sequence of songs and/or videos from both at least one cluster and at least one sub-cluster to include in the content recommendation list, wherein the sequence defines an order in which the respective songs and/or videos are played back to a user, and wherein the arrangement rules define:

an order in which to access the at least one cluster and the at least one sub-cluster during selection of the sequence, wherein the order defines accessing a first cluster or sub-cluster before accessing a second cluster or sub-cluster; and how many songs and/or videos to select from the first cluster or sub-cluster before accessing the second cluster or sub-cluster; and how many songs and/or videos to select from the second cluster or sub-cluster, wherein the rules specify that two or more songs and/or videos are selected from at least one of the first cluster or sub-cluster and the second cluster or sub-cluster; and providing arranged content delivery by outputting a stream of songs and/or videos arranged in the selected sequence, wherein the stream is configured to be sequentially reproduced in the arranged order.

* * * * *